(12) United States Patent
Xu et al.

(10) Patent No.: US 10,390,346 B2
(45) Date of Patent: Aug. 20, 2019

(54) METHOD, DEVICE, ACCESS POINT, AND STORAGE MEDIUM FOR CARRIER SELECTING

(71) Applicant: ZTE Corporation, Shenzhen, Guangdong (CN)

(72) Inventors: Hanqing Xu, Shenzhen (CN); Yajun Zhao, Shenzhen (CN); Linmei Mo, Shenzhen (CN)

(73) Assignee: ZTE Corporation, Shenzhen, Guanfdong (CN)

(*) Notice: Subject to any disclaimer, the term of this patent is extended or adjusted under 35 U.S.C. 154(b) by 0 days.

(21) Appl. No.: 15/523,696

(22) PCT Filed: May 5, 2015

(86) PCT No.: PCT/CN2015/078308
§ 371 (c)(1),
(2) Date: May 2, 2017

(87) PCT Pub. No.: WO2016/070597
PCT Pub. Date: May 12, 2016

(65) Prior Publication Data
US 2017/0339696 A1 Nov. 23, 2017

(30) Foreign Application Priority Data
Nov. 7, 2014 (CN) .......................... 2014 1 0626027

(51) Int. Cl.
*H04W 4/00* (2018.01)
*H04W 72/04* (2009.01)
(Continued)

(52) U.S. Cl.
CPC ....... *H04W 72/0453* (2013.01); *H04L 5/0048* (2013.01); *H04L 27/0006* (2013.01);
(Continued)

(58) Field of Classification Search
CPC ............. H04W 72/0453; H04W 48/16; H04W 72/1226; H04W 74/0808; H04L 5/001
See application file for complete search history.

(56) References Cited

U.S. PATENT DOCUMENTS 9,801,207 B2 * 10/2017 Sergeyev ............... H04L 5/0032
2013/0165134 A1 * 6/2013 Touag ............... H04W 72/0486
455/452.1
(Continued)

FOREIGN PATENT DOCUMENTS

CN 102123507 A 7/2011
CN 102202028 A 9/2011
(Continued)

OTHER PUBLICATIONS

International Search Report in international application No. PCT/CN2015/078308, dated Jul. 29, 2015, 2 pgs.
(Continued)

*Primary Examiner* — Abdelnabi O Musa
(74) *Attorney, Agent, or Firm* — Cooper Legal Group, LLC (57) ABSTRACT

The disclosure discloses a carrier selecting method and device, an access point and a storage medium. The method includes that: an access point selects unlicensed carriers satisfying a first condition from unlicensed carriers as a first carrier set; sends a discovery signal on all unlicensed carriers in the first carrier set; and the access point receives a measurement result performed by a user equipment on all the unlicensed carriers in the first carrier set, and selects unlicensed carriers satisfying a second condition from the first carrier set based on the measurement result as carrier resources of the access point.

15 Claims, 3 Drawing Sheets

(51) Int. Cl.
*H04L 5/00* (2006.01)
*H04L 27/00* (2006.01)
*H04W 48/16* (2009.01)
*H04W 48/18* (2009.01)
*H04W 72/12* (2009.01)
*H04W 74/08* (2009.01)

(52) U.S. Cl.
CPC .......... *H04W 48/16* (2013.01); *H04W 48/18* (2013.01); *H04W 72/1226* (2013.01); *H04L 5/001* (2013.01); *H04W 74/0808* (2013.01)

(56) References Cited

U.S. PATENT DOCUMENTS

| | | |
|---|---|---|
| 2013/0322371 A1 | 12/2013 | Prakash et al. |
| 2013/0336156 A1* | 12/2013 | Wei .................. H04L 5/001 370/252 |
| 2014/0120975 A1 | 5/2014 | Liu et al. |
| 2015/0373674 A1* | 12/2015 | Han .................. H04W 16/14 370/329 |
| 2016/0157233 A1 | 6/2016 | Bai et al. |
| 2017/0238272 A1* | 8/2017 | You .................. H04W 56/0015 370/350 |

FOREIGN PATENT DOCUMENTS

| | | |
|---|---|---|
| CN | 102232307 A | 11/2011 |
| CN | 102843696 A | 12/2012 |
| WO | 2013096563 A1 | 6/2013 |

OTHER PUBLICATIONS

English Translation of the Written Opinion of the International Search Authority in international application No. PCT/CN2015/078308, dated Jul. 29, 2015, 5 pgs.

Supplementary European Search Report in European application No. 15858066.2, dated Oct. 9, 2017, 11 pgs.

"Discussion on Solutions for Required Functionalities and Design Targets for LAA", Oct. 2014, Samsung, Discussion and Decision, R1-143879, 3GPP TSG RAN WG1 #78bis, Ljubljana, Slovenia, 3rd Generation Partnership Project, Retrieved from the Internet: URL:http://www.3gpp.org/ftp/Meetings_3GPP_SYNC/RAN1/Docs/, 4 pgs.

"Potential Design Options for LAA using LTE", Oct. 2014, R1-143776, 3GPP TSG-RAN WG1 #78bis, 3rd Generation Partnership Project, Intel Corporation, Discussion and Decision, Ljubljana, Slovenia, Retrieved from the Internet: URL:http://www.3gpp.org/ftp/tsg_ran/WG1_RL1/TSGR1_78b/Docs/,4 pgs.

* cited by examiner

METHOD, DEVICE, ACCESS POINT, AND STORAGE MEDIUM FOR CARRIER SELECTING

TECHNICAL FIELD

The disclosure relates to selection technique for unlicensed carriers, and in particular to a method, device, access point, and storage medium for carrier selecting.

BACKGROUND

Long Term Evolution (LTE) using unlicensed carriers (LTE-U) means the deployment of LTE in unlicensed carriers to meet the growing capacity requirements of LTE systems and improve the using efficiency of the unlicensed spectrum. It may be an important direction of evolution for LTE and future wireless communications. In the design of LTE-U, it is necessary to consider how to compete for unlicensed carriers with Wireless Fidelity (WiFi), radar and other different systems and the same system of LTE-U in a fair and friendly manner for data transmission, and it is necessary to affect little to and retain LTE technical features as much as possible. The LTE-U system may also be referred to as a LTE Licensed Assisted Access (LAA) system.

In a scenario where there are a number of unlicensed carriers, for example, a 5G spectrum may use a maximum of 24 unlicensed carriers of 20M bandwidth. The LAA access point may scan and monitor multiple unlicensed carriers before using an unlicensed carrier to give priority selection to an unlicensed carrier with the relatively light or the cleanest load for the LAA's own use.

At present, for the carrier selection on the unlicensed spectrum (also known as channel selection), the LAA access point does not have other means except for energy detection and carrier sensing. The LAA access point cannot recognize other LAA access points. Therefore, the traditional art cannot provide the presence of neighboring access points, including the presence of neighboring LAA access points and WiFi access points. Neither can the traditional art indicate whether the LAA access point is applicable to the User Equipment (UE). Therefore, there is a need for a more comprehensive channel selection algorithm to solve the above technical problems.

SUMMARY

In order to solve the above technical problems, embodiments of the disclosure provide a method, device, and access point for carrier selecting so that a communication system can communicate by using an unlicensed carrier. Thus, the communication system is extended and the communication capability is improved.

The technical proposal of the disclosure is realized as follows.

A carrier selecting method includes that:

an access point selects unlicensed carriers satisfying a first condition from unlicensed carriers as a first carrier set;

sends a discovery signal on all unlicensed carriers in the first carrier set; and the access point receives a measurement result performed by a user equipment on all the unlicensed carriers in the first carrier set, and selects unlicensed carriers satisfying a second condition from the first carrier set based on the measurement result as carrier resources of the access point.

As an implementation, after the access point selects unlicensed carriers satisfying a first condition from unlicensed carriers, the method further includes that:

the access point sends a first carrier set information, whether the unlicensed carriers send a discovery signal, and a discovery signal configuration parameter to the user equipment, and instructs the user equipment to measure all the unlicensed carriers in the first carrier set.

As an implementation, after selecting unlicensed carriers satisfying a second condition from the first carrier set based on the measurement result, the method further includes:

sending the information of the unlicensed carriers satisfying the second condition to the user equipment.

As an implementation, the method further includes:

updating a carrier resource of an unlicensed carrier of the access point when the access point does not use unlicensed carriers satisfying the second condition; and selecting at least one unlicensed carrier based on the selected unlicensed carrier satisfying the second condition as the current carrier resource when the access point uses unlicensed carriers satisfying the second condition.

As an implementation, after selecting at least one unlicensed carrier based on the selected unlicensed carrier satisfying the second condition, the method further includes:

sending information of the at least one unlicensed carrier to the user equipment.

As an implementation, after selecting at least one unlicensed carrier based on the selected unlicensed carrier satisfying the second condition, the method further includes that:

the access point sends ON/OFF instruction information of the at least one unlicensed carrier to the user equipment and/or neighboring access points through other unlicensed carriers that the access point has occupied on the licensed carrier.

As an implementation, the ON/OFF instruction information includes at least one of a carrier number, a carrier ON/OFF state, a carrier ON time, and a carrier ON time delay.

As an implementation, the access point sends the ON/OFF instruction information of the at least one unlicensed carrier to the user equipment and/or neighboring access points via Downlink Control Information (DCI), Radio Resource Control (RRC) signaling, or Media Access Control (MAC) signaling.

As an implementation, the access point sends a first carrier set information, whether the unlicensed carriers send a discovery signal, and a discovery signal configuration parameter to the user equipment via a currently available carrier.

As an implementation, updating a carrier resource of an unlicensed carrier of the access point includes:

continuously receiving the measurement result performed by the user equipment for all the unlicensed carriers in the first carrier set and selecting an unlicensed carrier satisfying the second condition from the first carrier set based on the measurement result as the carrier resource of the access point.

As an implementation, the first condition includes that:

it is set by the operator; and/or the carrier energy is less than the first set threshold and/or the carrier sensing is less than the second set threshold and/or the occupied subcarrier in the carrier is below the third set threshold; and the second condition includes that:

the number of carriers used by the neighboring access points is below the fourth set threshold and/or the discovery signal intensity is greater than the fifth set threshold and/or the load is below the sixth set threshold.

A carrier selecting method includes that:

an access point selects unlicensed carriers satisfying a first condition from unlicensed carriers as a first carrier set; and all the unlicensed carriers in the first carrier set are used as carrier resources of the access point.

As an implementation, the first condition includes that:

it is set by the operator; and/or the carrier energy is less than the first set threshold and/or the carrier sensing is less than the second set threshold and/or the occupied subcarrier in the carrier is below the third set threshold.

As an implementation, after the access point selects the unlicensed carrier satisfying the first condition from the unlicensed carriers, the method further includes that:

the access point sends information of all the unlicensed carriers in the first carrier set to the user equipment.

A carrier selecting device includes: a first selecting unit, a sending unit, a receiving unit and a second selecting unit, in which the first selecting unit is configured to select unlicensed carriers satisfying a first condition from unlicensed carriers as a first carrier set;

the sending unit is configured to send a discovery signal on all unlicensed carriers in the first carrier set;

the receiving unit is configured to receive a measurement result performed by a user equipment on all the unlicensed carriers in the first carrier set; and the second selecting unit is configured to select unlicensed carriers satisfying a second condition from the first carrier set based on the measurement result as carrier resources of the access point.

As an implementation, the sending unit is further configured to, after the first selecting unit selects unlicensed carriers satisfying a first condition from unlicensed carriers, send a first carrier set information, whether the unlicensed carriers send a discovery signal, and a discovery signal configuration parameter to the user equipment, and instruct the user equipment to measure all the unlicensed carriers in the first carrier set.

As an implementation, the device further includes: an updating unit and a third selecting unit, in which the updating unit is configured to update a carrier resource of an unlicensed carrier of the access point when the device does not use unlicensed carriers satisfying the second condition; and the third selecting unit is configured to select at least one unlicensed carrier based on the selected unlicensed carrier satisfying the second condition as the current carrier resource when the access point uses unlicensed carriers satisfying the second condition.

As an implementation, after the third selecting unit selects at least one unlicensed carrier based on the selected unlicensed carrier satisfying the second condition, the sending unit is further configured to send ON/OFF instruction information of the at least one unlicensed carrier to the user equipment and/or neighboring access points through other unlicensed carriers that the access point has occupied on the licensed carrier.

As an implementation, the ON/OFF instruction information includes at least one of a carrier number, a carrier ON/OFF state, a carrier ON time, and a carrier ON time delay.

As an implementation, the sending unit is further configured to send the ON/OFF instruction information of the at least one unlicensed carrier to the user equipment and/or neighboring access points via DCI, RRC signaling, or MAC signaling.

As an implementation, the first condition includes that:

it is set by the operator; and/or the carrier energy is less than the first set threshold and/or the carrier sensing is less than the second set threshold and/or the occupied subcarrier in the carrier is below the third set threshold; and the second condition includes that:

the number of carriers used by the neighboring access points is below the fourth set threshold and/or the discovery signal intensity is greater than the fifth set threshold and/or the load is below the sixth set threshold.

A carrier selecting device includes: a selecting unit and a determining unit, in which the selecting unit is configured to select unlicensed carriers satisfying a first condition from unlicensed carriers as a first carrier set; and the determining unit is configured to use all the unlicensed carriers in the first carrier set as carrier resources of the access point.

As an implementation, the first condition includes that:

it is set by the operator; and/or the carrier energy is less than the first set threshold and/or the carrier sensing is less than the second set threshold and/or the occupied subcarrier in the carrier is below the third set threshold.

As an implementation, the device further includes:

a sending unit configured to send information of the unlicensed carriers in the first carrier set to the user equipment.

An access point includes the carrier selecting device described above.

Provided is a storage medium in which a computer program is stored, in which the computer program is configured to perform the carrier selecting method.

In an embodiment of the disclosure, when an access point is found to have an available unlicensed carrier, all unlicensed carriers will be subjected to energy detection and carrier sensing to determine a first carrier set satisfying the first condition. A discovery signal is sent on all unlicensed carriers of the first carrier set and a measurement instruction signal is sent to the UE, so that the UE performs carrier measurements on all the unlicensed carriers of the first carrier set, such as performing measurements of neighboring access points and WiFi access points for the using situation of the above unlicensed carriers, channel interference and so on. The access point selects the unlicensed carriers having the smallest interference and using less or no subcarriers in carriers based on the measurement results as the current carrier resources of the access point. The unlicensed carrier selected by the embodiment of the disclosure has a high reliability, effectively extending the using range of the wireless communication carrier and improving the access capacity of the wireless communication system.

DETAILED DESCRIPTION

The disclosure will be described in further detail by way of examples with reference to the accompanying drawings, so that the aims, technical solutions and advantages of the disclosure will become more apparent.

In the embodiments of the disclosure, the LAA access point performs long term energy detection and carrier sensing on the unlicensed carriers in the set SetA. The SetA includes all the unlicensed carriers supported by the LAA access point capability level.

According to the energy detection and carrier sensing results, the LAA access point selects several of the cleanest unlicensed carriers from SetA as the set SetB. In an embodiment of the disclosure, the so-called clean carrier refers to an unlicensed carrier which is not occupied, or a carrier of which a subcarrier is lower than the set threshold, or an unlicensed carrier whose carrier load is below the set threshold. That is, the unlicensed carrier that is not occupied by other access points is selected as far as possible.

The LAA access point sends a Discovery Reference Signal (DRS) on the carrier in the SetB set. At the same time, information of all the unlicensed carriers in the SetB set, whether the carrier in the SetB set sends the DRS, DRS parameter configuration, and other information are sent to the UE through the currently available carrier, informing the UE of detecting the LAA access point in each of the alternative carriers in the SetB set, and/or the presence of the WiFi access point.

The UE receives the information of the set SetB and the DRS sent on each alternative carrier in the set SetB and measures the DRS. The DRS measurement result corresponding to each alternative carrier (including DRS sent by the neighboring area on the corresponding alternative carrier) is acquired; and/or the UE scans and detects the presence of WiFi in each alternative carrier in the SetB set. For example, the WiFi beacon signal may be detected to acquire the presence of WiFi in each alternative carrier.

The UE may send the above measurement and detection results by a primary cell (PCell, that is, a cell corresponding to the carrier currently used by the current access point) or other unlicensed carriers.

The LAA access point receives the UE feedback report and may learn about the presence of the neighboring LAA access point and/or the WiFi access point on each alternative carrier, and the channel situation from the access point to the UE. The secondary carrier selection is performed by the LAA access point internal carrier selection implementation algorithm. That is, a more applicable unlicensed carrier is selected in the SetB as the carrier resource for the access point to use, and the unlicensed carrier set performing the secondary carrier selection is the SetC.

After determining the SetC, the UE may be informed of the information of all unlicensed carriers in the SetC.

If there is no need for using unlicensed carriers, the LAA access point may semi-statically or statically update the set SetC; if there is a need for using unlicensed carriers, the LAA access point may quickly select the available carrier based on the SetC.

According to the unlicensed carrier selected by the foregoing SetC, the LAA access point may send the carrier ON/OFF instruction to the UE and/or neighboring access points through the PCell on the licensed carrier, the licensed carrier just occupied by the access point, and other unlicensed carriers that the access point has occupied. Alternatively, the LAA access point does not send the unlicensed carrier ON/OFF instruction to the UE, and the UE identifies it by blindly detecting the signal or channel sent on the carrier.

In an embodiment of the disclosure, the ON/OFF instruction includes at least one of the available carrier number, the available carrier ON/OFF state, the available carrier occupying time, and the available carrier opening time delay (the time from when the UE receives the instruction to when the carrier really sends a signal/channel).

In an embodiment of the disclosure, the manner of sending the ON/OFF instruction to the UE includes the following manner: through the downlink DCI instruction. For example, it may be broadcast in a similar format such as DCI 1A/3/3A/1C. Alternatively, it is instructed by RRC signaling, and MAC signaling, or the UE itself detects the downlink signal to implicitly determine the occupancy. In an embodiment of the disclosure, it is preferable to be quickly instructed by DCI.

The essence of the technical solution of an embodiment of the disclosure is further illustrated by the following specific examples.

Figure 1:
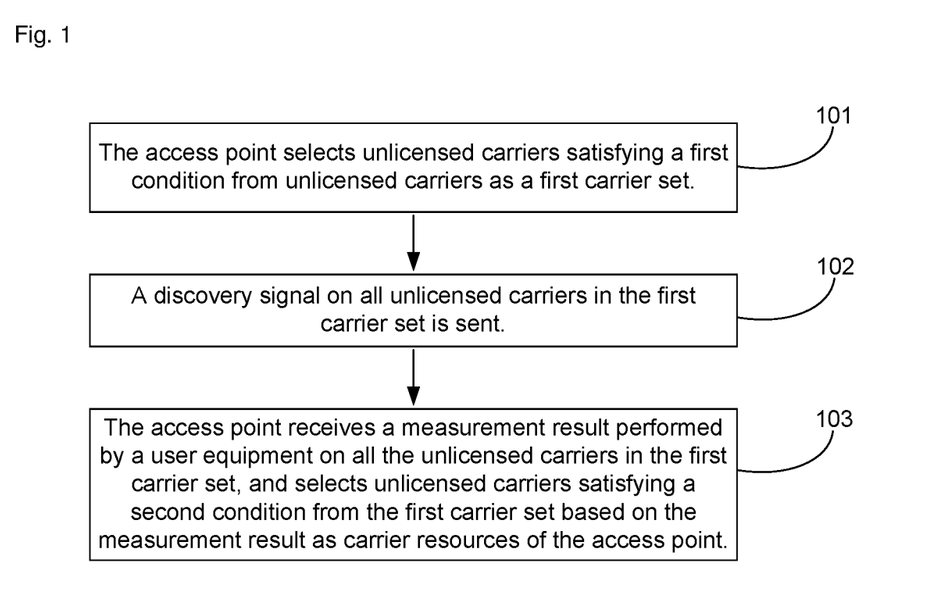
FIG. 1 is a flow diagram of a carrier selecting method according to a first embodiment of the disclosure.

FIG. 1 is a flow diagram of a carrier selecting method according to a first embodiment of the disclosure. As shown in FIG. 1, the carrier selecting method of the example includes the following steps.

Step 101: The access point selects unlicensed carriers satisfying a first condition from unlicensed carriers as a first carrier set.

In this step, the access point performs long term energy detection and carrier sensing on all unlicensed carriers, and selects the cleanest unlicensed carrier as the first carrier set.

The first condition includes that:

it is set by the operator; and/or the carrier energy is less than the first set threshold and/or the carrier sensing is less than the second set threshold and/or the occupied subcarrier in the carrier is below the third set threshold.

In an embodiment of the disclosure, the unlicensed carrier set by the operator may be all unlicensed carriers, or may be the unlicensed carriers that does not exceed the maximum number that the access point may support, or may be the unlicensed carriers that does not exceed the maximum number that the access point may support and that are set according to the limit such as geographical area.

After selecting unlicensed carriers satisfying a second condition from the first carrier set based on the measurement result, the method further includes:

sending the information of the unlicensed carriers satisfying the second condition to the user equipment.

Step 102: A discovery signal on all unlicensed carriers in the first carrier set is sent.

In an embodiment of the disclosure, a first carrier set information, whether the unlicensed carriers send a discovery signal, and a discovery signal configuration parameter is sent to the user equipment, and the user equipment is instructed to measure all the unlicensed carriers in the first carrier set.

Specifically, the access point sends the first carrier set information, whether the unlicensed carrier sends a discovery signal, and a discovery signal configuration parameter to the user equipment through a currently available carrier.

The DRS is measured after the UE receives the first carrier set information and the DRS sent on each alternative carrier in the set. The DRS measurement result corresponding to each alternative carrier is acquired; and/or the UE scans and detects the presence of WiFi in each alternative carrier in the SetB set. For example, the WiFi beacon signal may be detected to acquire the presence of WiFi in each alternative carrier. The UE may send the above measurement and detection results via PCell or other unlicensed carriers.

Step 103: The access point receives a measurement result performed by a user equipment on all the unlicensed carriers in the first carrier set, and selects unlicensed carriers satisfying a second condition from the first carrier set based on the measurement result as carrier resources of the access point.

The second condition includes that: the number of carriers used by the neighboring access points is below the fourth set threshold and/or the discovery signal intensity is greater than the fifth set threshold and/or the load is below the sixth set threshold.

After selecting unlicensed carriers satisfying a second condition from the first carrier set based on the measurement result, the method further includes:
sending the information of the unlicensed carriers satisfying the second condition to the user equipment.

In an embodiment of the disclosure, when suitable unlicensed carriers are selected, the unlicensed carriers are used as carrier resources of the access point so as to use these carrier resources to send information.

Figure 2:
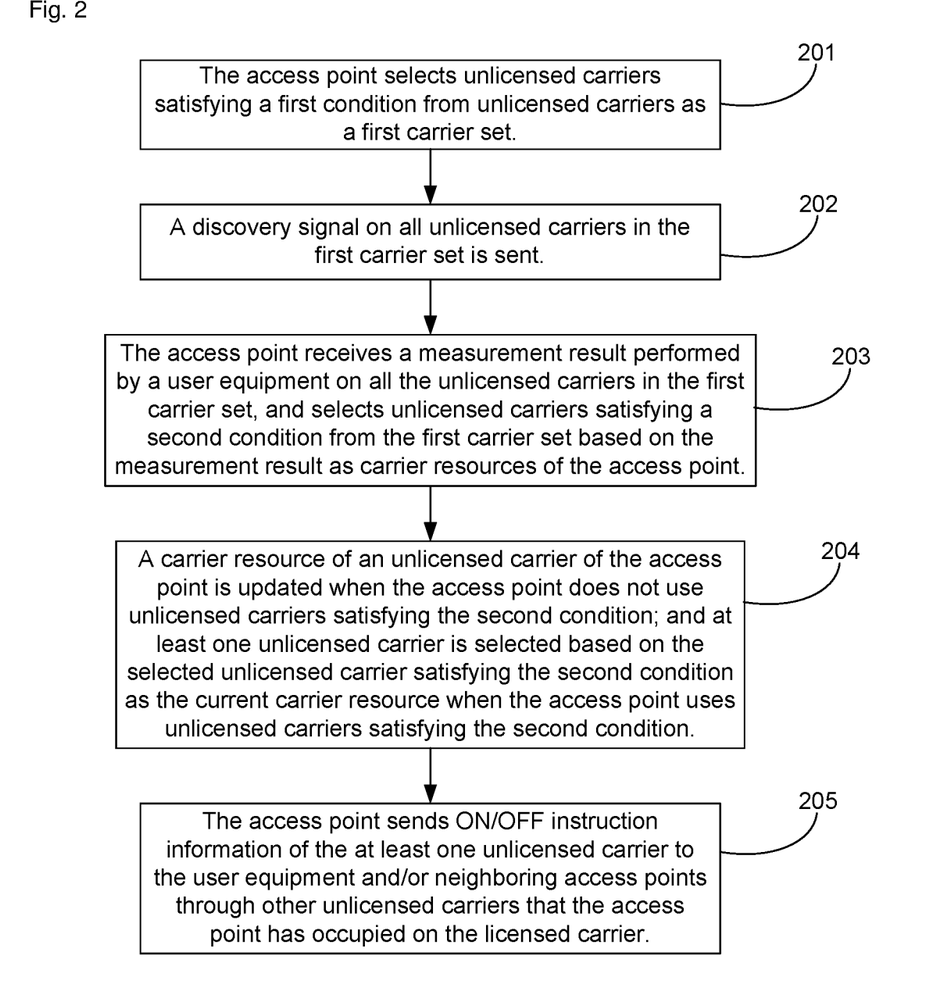
FIG. 2 is a flow diagram of a carrier selecting method according to a second embodiment of the disclosure.

FIG. 2 is a flow diagram of a carrier selecting method according to a second embodiment of the disclosure. As shown in FIG. 2, the carrier selecting method of the example includes the following steps.

Step 201: The access point selects unlicensed carriers satisfying a first condition from unlicensed carriers as a first carrier set.

In this step, the access point performs long term energy detection and carrier sensing on all unlicensed carriers, and selects the cleanest unlicensed carrier as the first carrier set.

The first condition includes that:
it is set by the operator; and/or
the carrier energy is less than the first set threshold and/or the carrier sensing is less than the second set threshold and/or the occupied subcarrier in the carrier is below the third set threshold.

In an embodiment of the disclosure, the unlicensed carrier set by the operator may be all unlicensed carriers, or may be the unlicensed carriers that does not exceed the maximum number that the access point may support, or may be the unlicensed carriers that does not exceed the maximum number that the access point may support and that are set according to the limit such as geographical area.

Step 202: A discovery signal on all unlicensed carriers in the first carrier set is sent.

In an embodiment of the disclosure, a first carrier set information, whether the unlicensed carriers send a discovery signal, and a discovery signal configuration parameter is sent to the user equipment, and the user equipment is instructed to measure all the unlicensed carriers in the first carrier set.

Specifically, the access point sends the first carrier set information, whether the unlicensed carrier sends a discovery signal, and a discovery signal configuration parameter to the user equipment through a currently available carrier.

The DRS is measured after the UE receives the first carrier set information and the DRS sent on each alternative carrier in the set. The DRS measurement result corresponding to each alternative carrier is acquired; and/or the UE scans and detects the presence of WiFi in each alternative carrier in the SetB set. For example, the WiFi beacon signal may be detected to acquire the presence of WiFi in each alternative carrier. The UE may send the above measurement and detection results via PCell or other unlicensed carriers.

Step 203: The access point receives a measurement result performed by a user equipment on all the unlicensed carriers in the first carrier set, and selects unlicensed carriers satisfying a second condition from the first carrier set based on the measurement result as carrier resources of the access point.

The second condition includes that: the number of carriers used by the neighboring access points is below the fourth set threshold and/or the discovery signal intensity is greater than the fifth set threshold and/or the load is below the sixth set threshold.

After selecting unlicensed carriers satisfying a second condition from the first carrier set based on the measurement result, the method further includes:
sending the information of the unlicensed carriers satisfying the second condition to the user equipment.

In an embodiment of the disclosure, when suitable unlicensed carriers are selected, the unlicensed carriers are used as carrier resources of the access point to use these carrier resources to send information. In order to make the access point select a more applicable unlicensed carrier, the embodiment of the disclosure also performs the following processing.

Step 204: A carrier resource of an unlicensed carrier of the access point is updated when the access point does not use unlicensed carriers satisfying the second condition; and at least one unlicensed carrier is selected based on the selected unlicensed carrier satisfying the second condition as the current carrier resource when the access point uses unlicensed carriers satisfying the second condition.

After selecting at least one unlicensed carrier based on the selected unlicensed carrier satisfying the second condition, the method further includes:
sending information of the at least one unlicensed carrier to the user equipment.

Step 205: The access point sends ON/OFF instruction information of the at least one unlicensed carrier to the user equipment and/or neighboring access points through other unlicensed carriers that the access point has occupied on the licensed carrier.

The ON/OFF instruction information includes at least one of a carrier number, a carrier ON/OFF state, a carrier ON time, and a carrier ON time delay.

The access point sends the ON/OFF instruction information of the at least one unlicensed carrier to the user equipment and/or neighboring access points via DCI, RRC signaling, or MAC signaling.

Figure 3:
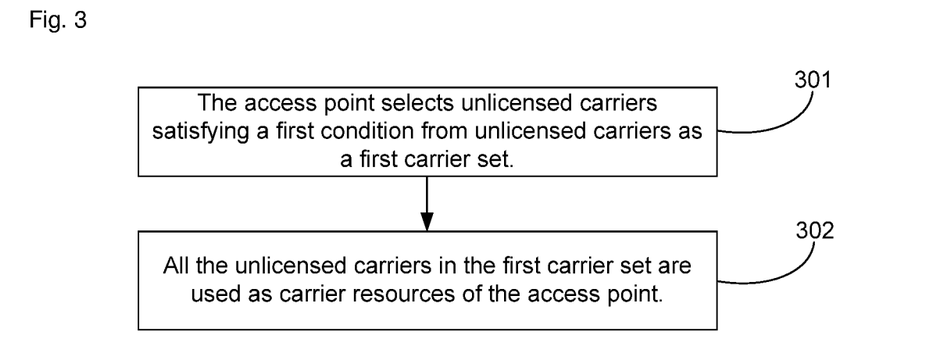
FIG. 3 is a flow diagram of a carrier selecting method according to a third embodiment of the disclosure.

FIG. 3 is a flow diagram of a carrier selecting method according to a third embodiment of the disclosure. As shown in FIG. 3, the carrier selecting method of the example includes the following steps.

Step 301: The access point selects unlicensed carriers satisfying a first condition from unlicensed carriers as a first carrier set.

In an embodiment of the disclosure, the first condition includes that:
it is set by the operator; and/or the carrier energy is less than the first set threshold and/or the carrier sensing is less than the second set threshold and/or the occupied subcarrier in the carrier is below the third set threshold.

Step 302: All the unlicensed carriers in the first carrier set are used as carrier resources of the access point.

In an embodiment of the disclosure, after the access point selects the unlicensed carrier satisfying the first condition from the unlicensed carriers, the method further includes that:

the access point sends information of all the unlicensed carriers in the first carrier set to the user equipment.

In an embodiment of the disclosure, the unlicensed carrier set by the operator may be all unlicensed carriers, or may be the unlicensed carriers that does not exceed the maximum number that the access point may support, or may be the unlicensed carriers that does not exceed the maximum number that the access point may support and that are set according to the limit such as geographical area.

For a better understanding of the above embodiments, the preferred embodiments of the above embodiments with reference to the relevant accompanying drawings are described in detail below.

The carrier selecting method of an embodiment of the disclosure includes the following steps.

Step 1: The LAA access point performs long-term energy detection and carrier sensing on the unlicensed carrier in the set SetA. The set SetA includes all the unlicensed carriers supported by the LAA access point capability level. In the embodiments of the disclosure, the unlicensed carrier in the set SetA may also be set by the operator, for example, may be the maximum number of the unlicensed carriers that the LAA access point may support in all unlicensed carriers, or may be the unlicensed carriers that does not exceed the maximum number that the LAA access point may support and that are set according to the limit such as geographical area.

For example, there is a certain LAA access point AP1 which supports up to 20 unlicensed carriers. The AP1 may scan the 20 unlicensed carriers in sequence to perform energy detection and carrier sensing. The 20 carriers are all unlicensed carriers that AP1 may support and the 20 carries are considered to be included in the set SetA. That is, the SetA includes a total of 20 carriers of UCC1 to UCC20. The period of detection here may be in an order of magnitude of 100 milliseconds or second.

Step 2: The LAA access point selects several of the cleanest unlicensed carriers as the set SetB according to the energy detection and carrier sensing results.

For example, after a long period of energy detection and carrier sensing on the 20 carriers in the set SetA, the LAA AP1 selects five carriers therefrom as the candidate carrier set SetB. Therefore, the SetB is a semi-static or static carrier selection result. For example, SetB={UCC1, UCC2, UCC3, UCC4, UCC5}, where UCC1 is the cleanest, UCC2 is slightly less clean than UCC1, and so on. In embodiments of the disclosure, the so-called clean carrier indicates that the unlicensed carrier is not occupied, or the carrier of which the subcarrier is lower than the set threshold.

Step 3: The LAA access point sends a DRS on the carrier in the SetB set. The information of the SetB set, whether the unlicensed carrier in the SetB sends the DRS, DRS parameter configuration, and other information are sent to the UE, informing the UE of detecting the LAA access point in each of the alternative carriers in the SetB set, and/or the presence of the WiFi access point.

The DRS may include a Primary Synchronization Signal (PSS)/Secondary Synchronization Signal (SSS), a CRS, and a CSI-RS (which can be configurable). The PSS/SSS and CRS are used for cell discovery and synchronization, and the CRS and CSI-RS are used for RRM measurement.

The DRS parameters may include one or more of the following: a period, bias, duration, a port, power, time-frequency resource, and so on.

For example, the transmission period of DRS may be 40 ms, 80 ms, 160 ms; the transmission bias of DRS may be 0 sub-frames to X sub-frames (X<=period−1); the duration of DRS may be 1 sub-frame to 5 sub-frames (2 sub-frames to 5 sub-frames in TDD mode); both CRS and CSI-RS in DRS adopt single port configuration.

As an implementation, it is also possible that the LAA access point does not inform the UE of the parameter configuration related to the DRS. The UE blindly detects the DRS sent by this area AP1 and the neighboring area. The method is suitable for relatively simple DRS parameter configuration, for example, only a few configurations. In this way, the UE detects the distribution of other LAA access points around the LAA AP1 and feeds it back to the access point.

Another way is to understand the distribution of other LAA access points around each access point by interacting the DRS configuration and the sending situation between neighboring LAA access points. The LAA access point then informs the UE of DRS parameter configuration of this area and the neighboring area. The interactive DRS configuration between the LAA access points may be sent over a wired connection or a wireless air interface. The wireless air interface may be sent via a licensed carrier or other unlicensed carriers. The LAA access point may send the sending situation of the DRS and the DRS configuration through the PCell on the licensed carrier to the UEs. By this method, LAA AP1 itself may understand the distribution of other LAA access points around it, without the need for the UE to detect and make a feedback of the distribution and number of other LAA access points.

Step 4: The UE receives the information of the set SetB and the DRS sent on each alternative carrier in the set and measures the DRS. The DRS measurement result corresponding to each alternative carrier (including DRS sent by the neighboring area on the corresponding alternative carrier) is acquired; and/or the UE scans and detects the presence of WiFi in each alternative carrier in the SetB set. For example, the WiFi beacon signal may be detected to acquire the presence of WiFi in each alternative carrier.

Thus, by UE detection and measurement, the UE may acquire the result corresponding to each alternative carrier in the set SetB: the presence of LAA on each alternative carrier (including the channel condition from AP1 to the UE acquired by the DRS measurement); and/or the presence of WiFi on each alternative carrier (which may be acquired by detecting the WiFi beacon signal).

Step 5: The UE may send the above measurement and detection results by PCell or other unlicensed carriers.

The UE sends the above measurement and detection results to PCell via the licensed carrier or to the LAA access point via other occupied unlicensed carriers.

Step 6: The LAA access point receives the UE feedback report and may learn about the presence of the neighboring LAA access point on each alternative carrier and/or the WiFi access point, and the channel situation from the access point to the UE. The secondary carrier selection is performed by the LAA access point internal carrier selection implementation algorithm.

The secondary carrier selection algorithm of the LAA access point may be comprehensively selected based on the number of neighboring LAA access points in each alternative carrier in the set SetB, the presence of WiFi main channel, a load condition, interference, channel fading, and so on. For example, the absence of WiFi main channel and the carrier having the least number of the neighbouring LAA access points may be preferably selected, and the load condition and the channel interference fading condition are preferably multiplied by different scale factors.

Another example is the carrier selection algorithm based on the following algorithm for carrier selection:

$$Pi = a \times NLAA\_i + b \times NWiFi\_i + c \times Loadi + d \times CSli;$$

where Pi is the priority factor of the unlicensed carrier i, a, b, c, and d are the scale factors of each metric, NLAA_i is the presence of the neighboring LAA access point on carrier i, NWiFi_i is the presence of the neighboring WiFi access point on carrier i, Loadi i is the load condition of carrier i, and CSli is the channel condition of UE to this LAA access point on carrier i.

Thus, LAA AP1 may acquire a new set of SetC. According to the above carrier selection algorithm, SetC may delete or maintain the number of alternative carriers based on the SetB, for example, may select three carriers from five carriers. It may also be reordered according to the carrier selection algorithm, such as SetC={UCC2, UCC3, UCC1, UCC4, UCC5}. Here UCC2 is comprehensively the best, UCC3 is slightly worse, and so on. Alternatively, if the carrier selected by the carrier selection algorithm is used directly, SetC contains only one carrier, that is, UCC2.

Step 7: If there is no need for using unlicensed carriers, the LAA access point may semi-statically or statically update the set SetC; if there is a need for using unlicensed carriers, the LAA access point may quickly select the available carrier based on the SetC.

AP1 may semi-statically or statically update the set SetC if there are sufficient AP1 licensed carriers for use, or if there is no need for the packet arrival, the UE arrival, the business balance; the AP1 may select the available carrier from SetC once the trigger condition used by the unlicensed carrier is met, such as the packet arrival, UE-Cell association, business balance. For example, in the preceding Step 5, SetC={UCC2, UCC3, UCC1, UCC4, UCC5}, and AP1 may perform LBT/CCA on these five carriers. If the current UCC2 is idle, UCC2 may be selected immediately as the using carrier. If the current UCC2 is occupied, the other available carriers may be selected in sequence. The LBT/CCA duration is generally greater than 20 us, and is not time-consuming. The dynamic carrier selection level or even the sub-frame level may be achieved from meeting the trigger conditions to being successful in the carrier selection.

Step 8: According to the unlicensed carrier selected by Step 7, the LAA access point may send the carrier ON/OFF instruction to the UE and/or neighboring access points through the PCell on the licensed carrier, the licensed carrier just occupied by the access point, and other unlicensed carriers that the access point has occupied. Alternatively, the LAA access point does not send the unlicensed carrier ON/OFF instruction to the UE, and the UE identifies it by blindly detecting the signal or channel sent on the carrier.

The specific content of the ON/OFF instruction may include at least one of the available carrier number, the available carrier ON/OFF state, the available carrier occupying time, and the available carrier opening time delay (the time from when the UE receives the instruction to when the carrier really sends a signal/channel).

In an embodiment of the disclosure, the manner of instruction includes that it may be broadcast in a similar format such as DCI 1A/3/3A/1C through the downlink DCI instruction. Alternatively, it is instructed by RRC signaling, and MAC signaling, or the UE itself detects the downlink signal to implicitly determine the occupancy. It is preferable to quickly instruct by DCI.

The first scenario takes into account the factors that the power consumption of the UE is reduced and the battery lifetime of the UE is extended. When a certain unlicensed carrier is in the idle period, the UE does not receive other signals on the carrier except that the DRS is received according to the fixed pattern.

Thus, when the available carriers are selected according to the dynamic carrier selection algorithm in the preceding Step 7, the UE may not receive the signal sent on the carrier. Thus, the LAA access point may send the carrier ON/OFF instruction to the UE via the PCell on the licensed carrier or other unlicensed carrier that the access point has occupied.

For example, Step 7 selects the unlicensed carrier UCC2 as the carrier. The PCell or other unlicensed carriers that the access point has occupied send the carrier ON/OFF instruction to the UE. The specific instruction content includes that: the available carrier number is UCC2, the available carrier ON/OFF status is ON, the available carrier occupying time is 10 ms, and the available carrier opening time delay is 0 ms.

In the second case, the UE may receive the signal or data sent on the unlicensed carrier at any time, including that the unlicensed carrier is in the idle period.

After the unlicensed carrier is occupied, the LAA access point may immediately send the ON/OFF instruction to the UE via the unlicensed carrier. Alternatively, the LAA access point does not send the unlicensed carrier ON/OFF instruction to the UE, and the UE identifies it by blindly detecting the signal or channel sent on the carrier.

In an embodiment of the disclosure, after selecting the unlicensed carrier, the LAA access point may also inform the UE of the information of the selected unlicensed carriers.

Figure 4:
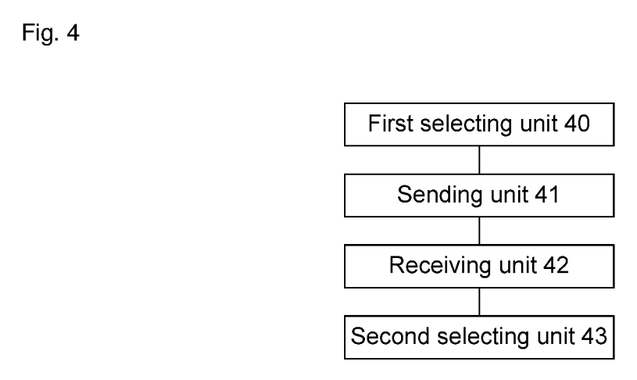
FIG. 4 is a composition structure schematic diagram of a carrier selecting device according to a first embodiment of the disclosure.

FIG. 4 is a composition structure schematic diagram of a carrier selecting device according to a first embodiment of the disclosure. As shown in FIG. 4, the carrier selecting device of the present example includes a first selecting unit 40, a sending unit 41, a receiving unit 42, and a second selecting unit 43, in which the first selecting unit 40 is configured to select unlicensed carriers satisfying a first condition from unlicensed carriers as a first carrier set;

the sending unit 41 is configured to send a discovery signal on all unlicensed carriers in the first carrier set;

the sending unit 41 is further configured to, after the first selecting unit 40 selects unlicensed carriers satisfying a first condition from unlicensed carriers, send a first carrier set information, whether the unlicensed carriers send a discovery signal, and a discovery signal configuration parameter to the user equipment, and instruct the user equipment to measure all the unlicensed carriers in the first carrier set;

the receiving unit 42 is configured to receive a measurement result performed by a user equipment on all the unlicensed carriers in the first carrier set; and the second selecting unit 43 is configured to select unlicensed carriers satisfying a second condition from the first carrier set based on the measurement result as carrier resources of the access point.

On the basis of the carrier selecting device shown in FIG. 4, the device further comprises an updating unit (not shown in FIG. 4) and a third selecting unit (not shown in FIG. 4), in which the updating unit is configured to update a carrier resource of an unlicensed carrier of the access point when the device does not use unlicensed carriers satisfying the second condition; and the third selecting unit is configured to select at least one unlicensed carrier based on the selected unlicensed carrier satisfying the second condition as the current carrier resource when the access point uses unlicensed carriers satisfying the second condition.

On the basis of the carrier selecting device shown in FIG. 4, after the third selecting unit selects at least one unlicensed carrier based on the selected unlicensed carrier satisfying the second condition, the sending unit is further configured to send ON/OFF instruction information of the at least one unlicensed carrier to the user equipment and/or neighboring access points through other unlicensed carriers that the access point has occupied on the licensed carrier.

In an embodiment of the disclosure, the ON/OFF instruction information includes at least one of a carrier number, a carrier ON/OFF state, a carrier ON time, and a carrier ON time delay.

In an embodiment of the disclosure, the sending unit 41 is further configured to send the ON/OFF instruction information of the at least one unlicensed carrier to the user equipment and/or neighboring access points via DCI, RRC signaling, or MAC signaling.

In an embodiment of the disclosure, the first condition includes that:

it is set by the operator; and/or the carrier energy is less than the first set threshold and/or the carrier sensing is less than the second set threshold and/or the occupied subcarrier in the carrier is below the third set threshold; and the second condition includes that:

the number of carriers used by the neighboring access points is below the fourth set threshold and/or the discovery signal intensity is greater than the fifth set threshold and/or the load is below the sixth set threshold.

It will be understood by those skilled in the art that the implementation functions of the processing units in the carrier selecting device shown in FIG. 4 may be understood with reference to the relevant description of the foregoing carrier selecting method and the embodiments thereof. It will be understood by those skilled in the art that the functions of the processing units in the carrier selecting device shown in FIG. 4 may be implemented by a program running on a processor or by a specific logic circuit.

Figure 5:
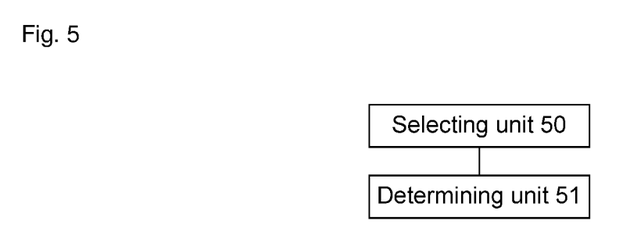
FIG. 5 is a composition structure schematic diagram of a carrier selecting device according to a second embodiment of the disclosure.

FIG. 5 is a composition structure schematic diagram of a carrier selecting device according to a second embodiment of the disclosure. As shown in FIG. 5, the carrier selecting device of the present example includes a selecting unit 50 and a determining unit 51, in which the selecting unit 50 is configured to select unlicensed carriers satisfying a first condition from unlicensed carriers as a first carrier set; and the determining unit 51 is configured to use all the unlicensed carriers in the first carrier set as carrier resources of the access point.

In an embodiment of the disclosure, the first condition includes that:

it is set by the operator; and/or the carrier energy is less than the first set threshold and/or the carrier sensing is less than the second set threshold and/or the occupied subcarrier in the carrier is below the third set threshold.

On the basis of the carrier selecting device shown in FIG. 5, the device further includes:

a sending unit (not shown in FIG. 5) configured to send information of the unlicensed carriers in the first carrier set to the user equipment.

It will be understood by those skilled in the art that the implementation functions of the processing units in the carrier selecting device shown in FIG. 5 may be understood with reference to the relevant description of the foregoing carrier selecting method and the embodiments thereof. It will be understood by those skilled in the art that the functions of the processing units in the carrier selecting device shown in FIG. 5 may be implemented by a program running on a processor or by a specific logic circuit.

An embodiment of the disclosure also describes an access point including the carrier selecting device of the foregoing embodiment shown in FIG. 4 or FIG. 5.

An embodiment of the disclosure also describes a storage medium in which a computer program is stored. The computer program is configured to perform the carrier selecting method of the foregoing embodiment.

In the absence of conflict, the technical solutions of the embodiments of the disclosure may be combined.

In several embodiments provided by the disclosure, it should be understood that the disclosed methods and smart devices may be implemented in other ways. The device embodiments described above are merely illustrative, for example, the division of the units is only a logical function division, and there may be other dividing ways in the actual implementation. For example, multiple units or components may be combined, or may be integrated into another system, or some feature may be ignored or not executed. In addition, the coupling or direct coupling or the communication connection between the components shown or discussed may be either an indirect coupling or communication connection between devices or units through a number of interfaces, which may have an electrical form, a mechanical form, or other forms.

The unit described above as a separating component may or may not be physically separated, and the component displayed as a unit may or may not be a physical unit, that is, may be located in one place or may be distributed over a plurality of network elements; a part or all of the units may be selected according to the actual needs to achieve the purpose of the solution of the present embodiment.

In addition, the functional units in the embodiments of the disclosure may be all integrated in one processing unit, or each unit may be used as a unit alone or two or more units may be integrated in one unit; the above integrated unit may be implemented in the form of hardware and may also be implemented in the form of hardware and software function units.

It will be understood by those of ordinary skill in the art that all or a part of the steps of implementing the method embodiments described above may be accomplished by applying instruction-related hardware. The foregoing application may be stored in a computer-readable storage medium. When executed, the application implements the steps including the method embodiment described above; and the foregoing storage medium includes a variety of media such as a mobile storage device, a Read-Only Memory (ROM), a Random Access Memory (RAM), a disk, or an optical disk, in which an application code may be stored.

Alternatively, if implemented in the form of a software function module and when sold or used as a separate product, the above integrated unit of the embodiment of the disclosure may also be stored in a computer-readable storage medium. Based on this understanding, the technical solution of the embodiment of the disclosure, in essence or for the part making a contribution to the traditional art, may be embodied in the form of a software product, and the computer software product is stored in a storage medium. The storage medium includes a number of instructions so that a computer device (which may be a personal computer, a server, or a network device, etc.) performs all or part of the method described in the various embodiments of the disclosure. However, the above storage medium includes a variety of media such as a mobile storage device, a ROM, a RAM, a disk, or an optical disk, in which an application code may be stored.

As described above, it is merely the specific embodiments of the disclosure, but the scope of protection of the disclosure is not limited thereto, and any variations or substitutions easily conceivable within the technical scope of the disclosure by people skilled in the art should be covered within the scope of protection of the disclosure.

INDUSTRIAL APPLICABILITY

In the disclosure, when an access point finds there's an available unlicensed carrier, the access point will perform energy detection and carrier sensing on all unlicensed carriers to determine a first carrier set satisfying the first condition. A discovery signal is sent on all unlicensed carriers of the first carrier set and a measurement instruction signal is sent to the UE, so that the UE performs carrier measurements on all the unlicensed carriers of the first carrier set. For example, measurements can be performed by neighbouring access points and WiFi access points on situations such as use condition, channel interference, and so on of the above unlicensed carriers.

What is claimed is:

1. A carrier selecting method, wherein the method comprises:
    selecting, by an access point, unlicensed carriers satisfying a first condition from unlicensed carriers as a first carrier set;
    sending a discovery signal on all unlicensed carriers in the first carrier set; and
    receiving, by the access point, a measurement result performed by a user equipment on all the unlicensed carriers in the first carrier set, and selecting unlicensed carriers satisfying a second condition from the first carrier set based on the measurement result as carrier resources of the access point;
    wherein the first condition comprises at least one of:
        carrier energy being less than a first set threshold, carrier sensing being less than a second set threshold, or a number of occupied subcarriers in the carrier being below a third set threshold; and
    wherein the second condition comprises at least one of:
        a number of carriers used by neighboring access points being below a fourth set threshold, a discovery signal intensity being greater than a fifth set threshold, or a load being below a sixth set threshold.

2. The method according to claim 1, wherein after the access point selects unlicensed carriers satisfying a first condition from unlicensed carriers, the method further comprises:
    sending, by the access point, a first carrier set information, whether the unlicensed carriers send a discovery signal, and a discovery signal configuration parameter to the user equipment, and instructing the user equipment to measure all the unlicensed carriers in the first carrier set.

3. The method according to claim 2, wherein the access point sends the first carrier set information, whether the unlicensed carriers send the discovery signal, and the discovery signal configuration parameter to the user equipment via a currently available carrier.

4. The method according to claim 1, wherein after selecting unlicensed carriers satisfying a second condition from the first carrier set based on the measurement result, the method further comprises:
    sending information of the unlicensed carriers satisfying the second condition to the user equipment.

5. The method according to claim 1, wherein the method further comprises:
    updating a carrier resource of an unlicensed carrier of the access point when the access point does not use unlicensed carriers satisfying the second condition; and
    selecting at least one unlicensed carrier based on the at least one unlicensed carrier satisfying the second condition as a current carrier resource when the access point uses unlicensed carriers satisfying the second condition.

6. The method according to claim 5, wherein after selecting at least one unlicensed carrier based on the at least one unlicensed carrier satisfying the second condition, the method further comprises:
    sending information of the at least one unlicensed carrier to the user equipment.

7. The method according to claim 5, wherein after selecting at least one unlicensed carrier based on the at least one unlicensed carrier satisfying the second condition, the method further comprises:
    sending, by the access point, ON/OFF instruction information of the at least one unlicensed carrier to at least one of the user equipment or the neighboring access points through other unlicensed carriers that the access point has occupied on a licensed carrier.

8. The method according to claim 7, wherein the ON/OFF instruction information comprises at least one of a carrier number, a carrier ON/OFF state, a carrier ON time, or a carrier ON time delay.

9. The method according to claim 7, wherein the access point sends the ON/OFF instruction information of the at least one unlicensed carrier to at least one of the user equipment or the neighboring access points via Downlink Control Information (DCI), Radio Resource Control (RRC) signaling, or Media Access Control (MAC) signaling.

10. The method according to claim 5, wherein updating a carrier resource of an unlicensed carrier of the access point comprises:
    continuously receiving the measurement result performed by the user equipment for all the unlicensed carriers in the first carrier set and selecting an unlicensed carrier satisfying the second condition from the first carrier set based on the measurement result as a carrier resource of the access point.

11. A non-transitory storage medium in which a computer program is stored, wherein the computer program is configured to perform the carrier selecting method according to claim 1.

12. A carrier selecting device, wherein the device comprises:
- a processor; and
- a memory for storing instructions executable by the processor;

wherein the processor is configured to:
- select unlicensed carriers satisfying a first condition from unlicensed carriers as a first carrier set;
- send a discovery signal on all unlicensed carriers in the first carrier set;
- receive a measurement result performed by a user equipment on all the unlicensed carriers in the first carrier set; and
- select unlicensed carriers satisfying a second condition from the first carrier set based on the measurement result as carrier resources of an access point;

wherein the first condition comprises at least one of:
- carrier energy being less than a first set threshold, carrier sensing being less than a second set threshold, or a number of occupied subcarriers in the carrier being below a third set threshold; and wherein the second condition comprises at least one of:
- a number of carriers used by neighboring access points being below a fourth set threshold, a discovery signal intensity being greater than a fifth set threshold, or a load being below a sixth set threshold.

13. The device according to claim 12, wherein the processor is further configured to, after selecting unlicensed carriers satisfying a first condition from unlicensed carriers, send the first carrier set information, whether the unlicensed carriers send a discovery signal, and a discovery signal configuration parameter to the user equipment, and instruct the user equipment to measure all the unlicensed carriers in the first carrier set.

14. The device according to claim 12, wherein the processor is further configured to update a carrier resource of an unlicensed carrier of the access point when the device does not use unlicensed carriers satisfying the second condition; and
- select at least one unlicensed carrier based on the at least one unlicensed carrier satisfying the second condition as a current carrier resource when the access point uses unlicensed carriers satisfying the second condition.

15. An access point, wherein the access point comprises the carrier selecting device according to claim 12.

* * * * *